United States Patent [19]
Gay

[11] Patent Number: 4,963,594
[45] Date of Patent: Oct. 16, 1990

[54] HEAT/COLOR STABILIZED POLYMERS OF VINYL CHLORIDE

[75] Inventor: Michel Gay, Lyons, France

[73] Assignee: Rhone-Poulenc Specialites Chimiques, Courbevoie, France

[21] Appl. No.: 389,576

[22] Filed: Jul. 21, 1989

Related U.S. Application Data

[63] Continuation of Ser. No. 686,146, Dec. 26, 1984, abandoned, which is a continuation of Ser. No. 479,936, Mar. 29, 1983, abandoned.

[30] Foreign Application Priority Data

Mar. 30, 1982 [FR] France ............................... 82 05700

[51] Int. Cl.$^5$ .............................................. C08K 5/37
[52] U.S. Cl. .................... 524/305; 524/181; 524/182; 524/302; 524/303; 524/304; 524/396; 524/399; 524/400; 252/400.52
[58] Field of Search ............... 524/399, 181, 182, 302, 524/303, 305, 304, 400, 396; 252/400.52

[56] References Cited

U.S. PATENT DOCUMENTS

| | | | |
|---|---|---|---|
| 2,564,646 | 8/1951 | Leistner et al. | 524/151 |
| 2,867,594 | 1/1959 | Hansen et al. | 524/399 |
| 3,396,132 | 8/1968 | Perry et al. | 524/399 |
| 3,417,039 | 12/1968 | Penneck | 524/399 |
| 4,102,839 | 7/1978 | Czochemore et al. | 524/357 |
| 4,123,399 | 10/1978 | Gay | 524/357 |

FOREIGN PATENT DOCUMENTS 771857 4/1957 United Kingdom .
818738 6/1957 United Kingdom .
1001344 5/1963 United Kingdom .

OTHER PUBLICATIONS

Mori, K. et al—J. Applied Polymer Science, vol. 27, 1067–1079 (1982).
Saville, B.—J. Chem. Soc. 5040–5045 (1962).
Smith, V.—British Plastics (Aug. 1954), 307–311, 364 (1976).
Hoang et al.—European Polymer Journal, vol. 12, 347–364 (1976).
Hoang et al—J. Macromolecular Sci.-Chem. A12(3) 411–440 (1978).
Michel et al—Poly. Degradation & Stability 3 (1980–1981) 107–119.
Chevassus—The Stabilization of Polyvinyl Chloride (1963) 31–73 and 173–175.
Stapfer, C. H. et al—SPE Journal (May 1972), vol. 28, 22–26.
Stapfer, C. H. et al—A.C.S. Div. Polymer Chemistry, Polymer Preprints, Mar. 1971, vol. 12, No. 1 795–802.

*Primary Examiner*—Veronica P. Hoke
*Attorney, Agent, or Firm*—Burns, Doane, Swecker & Mathis

[57] ABSTRACT

Vinyl chloride based polymers are heat/color stabilized by formulating therewith a stabilizing amount of (i) at least one organozinc derivative, (ii) at least one organic derivative of a metal from Group IIa of the Periodic Table, and (iii) at least one thiomalic acid diester.

14 Claims, No Drawings

HEAT/COLOR STABILIZED POLYMERS OF VINYL CHLORIDE

This application is a continuation of application Ser. No. 686,146, filed Dec. 26, 1984 which is a continuation application of Ser. No. 479,936, filed Mar. 29, 1983, all now abandoned.

BACKGROUND OF THE INVENTION

1. Field of the Invention:

The present invention relates to novel stabilized polymeric compositions based on vinyl chloride, shaped articles prepared therefrom, and to a process for the stabilization of vinyl chloride polymers.

2. Description of the Prior Art:

It is known to this art that polymers based on vinyl chloride must be subjected to temperatures on the order of 160° C. to 180° C., sometimes even to higher temperatures, especially during the preparation of shaped articles therefrom. To prevent or retard the various phenomena of yellowing due to these heat treatments, vinyl polymers are stabilized by the addition of various compounds thereto. Many publications feature the use of sulfur compounds for heat stabilization.

And the majority of these publications relate to organic sulfur compounds of tin, but such compounds are toxic to a greater or lesser extent.

British Patent No. 1,001,344 is directed to compositions based on polyvinyl chloride (PVC) which comprise:

(a) One or more organic compounds of lithium, sodium, potassium, magnesium, calcium, zinc, strontium, cadmium, barium, aluminum, lead or tin;

(b) An organic or organometallic sulfur compound having a boiling point, under atmospheric pressure, of not less than 200° C.; a compound of this type can be an alkyl or aryl sulfide, a mercaptocarboxylic acid, such as, in particular, thioglycolic acid, dithiodiglycolic acid, mercaptopropionic acid, thiodipropionic acid or dithiodipropionic acid, or esters of these acids; and (c) An organic antioxidant which inhibits the chain reactions entailing decomposition of the PVC, and which is, in particular, a substituted derivative of phenol.

It is very difficult to select, from among the innumerable sulfur compounds which fall within the broad definition in said '344 patent, those which do in fact exert a heat-stabilizing influence.

SUMMARY OF THE INVENTION

Accordingly, major objects of the present invention are the provision of improved means for the stabilization of halocarbon polymers, notably polymers based on vinyl chloride, and improved heat-stabilized halocarbon polymer compositions produced thereby, said stabilizing means comprising the conjoint formulation with such polymers of:

(i) at least one organozinc derivative;

(ii) at least one organic derivative of a metal from Group IIa of the Periodic Table (such as published, for example, in the 51st edition of *Handbook Of Chemistry And Physics*, published by The Chemical Rubber Company); and (iii) at least one thiomalic acid diester.

DETAILED DESCRIPTION OF THE INVENTION

More particularly according to this invention, in the description which follows, an alkyl radical having from 1 to 4 carbon atoms will be designated a "lower" alkyl radical and an alkoxy radical having from 1 to 4 carbon atoms will be designated "lower" alkoxy radical.

The thiomalic acid diesters which are employed in the process/composition according to the invention are more particularly those which correspond:

(1) either to the general formula (I):

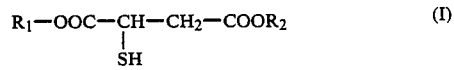

in which the radicals $R_1$ and $R_2$, which are identical or different, represent:

(a) a linear or branched chain aliphatic hydrocarbon radical which is saturated or contains one or more units of ethylenic unsaturation and which can contain one or more oxygen atoms —O— or sulfur atoms —S—;

(b) a monocyclic or polycyclic cycloaliphatic or cycloaliphatic-aliphatic hydrocarbon radical in which the cyclic moiety optionally bears one or more alkyl or alkoxy substituents, can contain one or more units of ethylenic unsaturation and can be bonded to the aliphatic moiety via an oxygen atom —O—;

(c) an arylaliphatic hydrocarbon radical in which the cyclic moiety optionally bears one or more alkyl or alkoxy substituents and can be bonded to the aliphatic moiety via an oxygen atom —O—; or (d) a sequence of a plurality of the aforementioned radicals;

(2) or to the general formula (II):

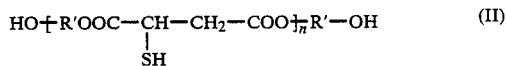

in which:

n is an integer ranging from 1 to 10 and

R' represents:

(a) a linear or branched chain divalent aliphatic hydrocarbon radical which is saturated or contains one or more units of ethylenic unsaturation, and of which the sequence can contain one or more oxygen atoms —O— or sulfur atoms —S— or one or more of the groups —COO—;

(b) a monocyclic or polycyclic cycloaliphatic or cycloaliphatic-aliphatic divalent hydrocarbon radical in which the cyclic moiety optionally bears one or more alkyl or alkoxy substituents, can contain one or more units of ethylenic unsaturation and can be bonded to the aliphatic moiety via an oxygen atom —O—;

(c) a divalent arylaliphatic hydrocarbon radical in which the cyclic moiety optionally bears one or more alkyl or alkoxy substituents and can be bonded to the aliphatic moiety via an oxygen atom —O—; or (d) a sequence of a plurality of the aforementioned radicals.

By the terms "organic derivative of zinc" or simply "organozinc derivative" and "organic derivative of a metal from Group IIa", there are intended:

[α] Salts, the anions of which originate basically from aliphatic monocarboxylic or dicarboxylic acids having from 2 to 24 carbon atoms, which may or may not be saturated, or from monoalkyl esters, having 1 to 24 carbon atoms, or monoalkenyl esters, having 3 to 24 carbon atoms, of the above aliphatic dicarboxylic acids, which may or may not be substituted, or from aromatic or alicyclic monocarboxylic acids, which may or may not be substituted; among the anions advantageously employed, representative are those derived from maleic, acetic, diacetic, propionic, hexanoic, 2-ethylhexanoic, octanoic, decanoic, undecanoic, lauric, myristic, palmitic, stearic, oleic, ricinoleic, behenic, hydroxystearic, hydroxyundecanoic, benzoic, phenylacetic, alkylbenzoic, para-tert.-butylbenzoic and salicylic acids;

[β] Metal derivatives (phenolates) of substituted or unsubstituted phenolic compounds, such as phenol or phenols substituted by an alkyl radical preferably having from 4 to 24 carbon atoms;

[γ] Mercaptides, for example, the zinc salt of isooctyl 2-mercaptoacetate; or

[δ] Chelates of 8-dicarbonyl compounds.

For practical reasons or for economic reasons, the metal derivatives derived from carboxylic acids or from phenol compounds are preferably selected from among those noted above.

Thus, the zinc salts of propionic, octanoic, lauric, stearic, oleic, ricinoleic, benzoic, para-tert.-butylbenzoic and salicylic acids or of mono-2-ethylhexyl maleate, and zinc nonylphenates, are advantageously used as the compounds (i), and the calcium, magnesium, barium or strontium salts of propionic, octanoic, lauric, stearic, oleic, ricinoleic, benzoic, para-tert.-butylbenzoic and salicylic acids and of mono-2ethylhexyl maleate, and the nonylphenates of calcium, magnesium, barium or strontium, are advantageously used as the compounds (ii).

Proportions of 0.005 to 1% by weight of compound (i), and preferably of 0.01 to 0.6%, relative to the polymer to be stabilized, provide very good results.

Among the derivatives mentioned noted as (ii), the most advantageously used being the calcium, barium, strontium or magnesium derivatives, preferred are the calcium derivatives and the magnesium derivatives, especially the calcium derivatives which provide very good results indeed. These derivatives are also advantageously used in mixtures, for example, Ca and Ba or Ca and Mg. For reasons of efficacy, the mixture Ca/Mg is preferred from among these mixtures.

Proportions of 0.005 to 5% by weight of the compound (ii), and preferably of 0.02 to 1%, relative to the polymer to be stabilized, enable obtainment of good results when added to the other stabilizers of the subject compositions.

Among the aforesaid thiomalic acid diesters (iii), the following are the preferred:

(A) those which correspond to the general formula (I) in which $R_1$ and $R_2$, which are identical or different, represent:

(a) a linear or branched aliphatic hydrocarbon radical which is saturated or contains one or more units of ethylenic unsaturation, which has from 2 to 36 carbon atoms and which can contain one or more oxygen atoms —O— or sulfur atoms —S—;

(b) a cycloaliphatic hydrocarbon radical comprising one or more rings, the ring or rings having a total of 5 to 12 carbon atoms and being optionally substituted by one or more alkyl or alkoxy radicals having 1 to 6 carbon atoms;

(c) a cycloalkyl-aliphatic or cycloalkenyl aliphatic hydrocarbon radical comprising one or more rings having a total of 5 to 12 carbon atoms, and of an aliphatic hydrocarbon sequence which has 1 to 6 carbon atoms and can be bonded to the cyclic moiety via an oxygen atom —O—;

(d) an arylaliphatic hydrocarbon radical, the cyclic moiety of which is optionally substituted by one or more alkyl radicals having from 1 to 12 carbon atoms or alkoxy radicals having 1 to 6 carbon atoms, and of which the aliphatic sequence has 1 to 6 carbon atoms and can be bonded to the cyclic moiety via an oxygen atom —O—; or (e) a sequence of a plurality of the aforementioned radicals; and (B) those which correspond to the general formula (II) in which:

n is an integer ranging from 1 to 6 and

R' represents:

(a) a linear or branched chain divalent aliphatic hydrocarbon radical which is saturated or contains one or more units of ethylenic unsaturation, which has from 2 to 24 carbon atoms and the sequence of which can contain one or more oxygen atoms —O— or sulfur atoms —S—;

(b) a radical —$R_3$—COO—$R_4$—, $R_3$ and $R_4$, which are identical or different, being linear or branched chain aliphatic divalent hydrocarbon radicals which are saturated or contain one or more units of ethylenic unsaturation, $R_3$ having from 1 to 18 carbon atoms and $R_4$ having from 2 to 18 carbon atoms;

(c) a divalent cycloaliphatic hydrocarbon radical comprising one or more rings which have a total of 5 to 12 carbon atoms and can be substituted by one or more alkyl or alkoxy radicals having from 1 to 6 carbon atoms;

(d) a divalent cycloalkylene-alkylene, cycloalkylene dialkylene, cycloalkenylene-alkylène or cycloalkenylene dialkylene radical which contains one or more rings which have a total of 5 to 12 carbon atoms and can be substituted by one or more alkyl or alkoxy radicals having from 1 to 6 carbon atoms, and the aliphatic moieties of which have from 1 to 6 carbon atoms and can be bonded to the ring via an oxygen atom —O—;

(e) a phenylenedialkylene radical, the ring of which optionally being substituted by one or more alkyl or alkoxy radicals having from 1 to 6 carbon atoms, and the aliphatic moieties of which can be bonded to the ring via an oxygen atom —O—; or (f) a sequence of a plurality of the aforementioned radicals.

In the case of problems of high-temperature processing of polymers based on vinyl chloride, it is preferable, in the process according to the invention, to use thiomalic acid diesters having a boiling point above 150° C. Most frequently, this boiling point is equal to at least 170° C.

Among the thiomalic acid diesters described above, more preferred are:

(A') those which correspond to the general formula (I) in which $R_1$ and $R_2$, which are identical or different, represent:

(a) a linear or branched chain monovalent aliphatic hydrocarbon radical which is saturated or contains one or more units of ethylenic unsaturation, which has from 4 to 36 carbon atoms and the sequence of which can contain one or more oxygen atoms —O— or sulfur atoms —S—;

(b) a cyclohexyl or cyclohexyl-alkyl radical, the ring of which is optionally substituted by one or more alkyl or alkoxy radicals having 1 to 6 carbon atoms, and the aliphatic moiety of which, if present, contains from 1 to 6 carbon atoms and can be bonded to the ring via an oxygen atom —O—;

(c) a phenylalkyl radical, the ring of which is optionally substituted by one or more alkyl or alkoxy radicals having 1 to 6 carbon atoms, and the aliphatic moiety of which contains from 1 to 6 carbon atoms and can be bonded to the ring via an oxygen atom —O—; or (d) a sequence of a plurality of the above radicals; and (B') those which correspond to the general formula (II) in which:

n is an integer ranging from 1 to 4 and
R' represents:
(a) a linear or branched chain alkylene radical having from 2 to 24 carbon atoms;
(b) a radical —$R_3$—COO—$R_4$, $R_3$ and $R_4$ which are identical or different, being linear or branched chain aliphatic hydrocarbon radicals which are saturated or contain one or more units of ethylenic unsaturation, $R_3$ having from 1 to 18 carbon atoms and $R_4$ having from 2 to 18 carbon atoms;
(c) a cyclohexylene radical, a cyclohexylene alkylene radical or a cyclohexylene-dialkylene radical, the ring of which is optionally substituted by one or more alkyl or alkoxy radicals having 1 to 6 carbon atoms, and the aliphatic moieties of which, if present, contain from 1 to 6 carbon atoms and can be bonded to the ring via an oxygen atom —O—;
(d) a tricyclo(5,2,1,0$^{2,6}$)decane-4,8 8-dimethylene radical;
(e) a phenylenedialkylene radical, the ring of which is optionally substituted by one or more alkyl or alkoxy radicals having from 1 to 6 carbon atoms, and the aliphatic moieties of which contain from 1 to 6 carbon atoms and can be bonded to the ring via an oxygen atom —O—; or
(f) a sequence of a plurality of the above radicals.

The following are representative of preferred thiomalic acid diesters which are useful according to the invention: butyl thiomalate, hexyl thiomalate, 2-ethylhexyl thiomalate, octyl thiomalate, dodecyl thiomalate, octadecyl thiomalate, eicosyl thiomalate, benzyl thiomalate, cyclohexyl thiomalate, phenethyl thiomalate, 4-tert.-butylcyclohexyl thiomalate, 2-mercaptoethyl thiomalate, 2-butoxyethyl thiomalate, 2-ethoxyethyl thiomalate, 2-(2-n-butoxyethoxy)-ethyl thiomalate, 2-(2-ethoxyethoxy)-ethyl thiomalate, ethylene glycol thiomalate, propane-1,2-diol thiomalate, propane-1,3-diol thiomalate, butane-1,2-diol thiomalate, butane-1,3-diol thiomalate, butane-1, 4-diol thiomalate, butane-1,6-diol thiomalate, hexane-1,6-diol thiomalate, neopentylglycol thiomalate, 2-methyl-2propylpropane-1,3-diol thiomalate, 2,2,4-trimethylpentane-1,3diol thiomalate, 1,2,6-trimethylhexanediol thiomalate, 2ethylhexane-1,3-diol thiomalate, 2,2-bis-[4-(2-hydroxy-ethoxy) phenyl]-propane thiomalate, 2,2-bis-[4-(2-hydroxy-propoxy) phenyl]-propane thiomalate, 1,4-bis-(hydroxymethyl)-cyclohexyl thiomalate, the thiomalate of hydrogenated bisphenol A, 4,8-bis (hydroxymethyl)-tricyclo(5,2,1,0$^{2,6}$)decyl thiomalate, cyclohexane-1,4-diol thiomalate and 2,2'-thiodiethanol thiomalate.

The thiomalic acid diesters are used in proportions which vary greatly according to their molecular weight, but which typically range from 0.005 to 5% and preferably from 0.5 to 2% by weight, relative to the polymer.

In general, it will be appreciated that the proportion by weight of each of the constituents of the compositions according to the invention will be the higher, in the polymeric compositions to be stabilized, the more rigid the latter, namely, the smaller the amount of plasticizer they contain.

Within the range of the various proportions given for each of the constituents (i), (ii) and (iii), relative to the polymer, it will be clearly understood that those skilled in the art may find it necessary to adapt the relative ratios of these various constituents in order to obtain a particular formulation intended more especially for producing the desired result, or according to the origin or method of preparation of the polymer.

Thus, for example, the polymers prepared in suspension can generally contain a higher proportion of zinc than polymers prepared in bulk, but these proportions nevertheless preferably remain within the values indicated above. In conjunction with the organic derivatives of zinc and of the metals from Group IIa of the Periodic Table, and with the thiomalic acid esters, it can be advantageous to use a polyol in carrying out the process according to the invention, even though the presence of this compound is not essential. Its presence is particularly advantageous for stabilizing polymers based on vinyl chloride which are prepared in bulk.

The polyols are generally suitable for prolonging the stabilizing effect of the metal compounds or organic compounds used in the process/composition according to the invention. However, a compromise must be found because these products tend to adversely color the compositions. In the case of problems of high-temperature processing of polymers based on vinyl chloride, the polyols used in the stabilization according to the invention preferably have a boiling point above 150° C. and most frequently above 170° C.

Examples of such polyols which are representative are triols such as trimethylolpropane, glycerol, hexane-1,2,6-triol, butane-1,2,4-triol and tris-hydroxyethyl isocyanurate, tetrols such as pentaerythritol and diglycerol, pentitols such as xylitol, hexitols such as sorbitol, mannitol and dipentaerythritol polyols containing eight hydroxyl groups, such as tripentaery thritol, and polymers containing free hydroxyl groups, such as polyvinyl alcohols, in particular those in which there remains less than 30 mol% of ester groups relative to the hydroxyl and ester groups together, and which have a viscosity at 20° C., in a 4% strength by weight aqueous solution, of between about 4 Pascal.second and 60 Pascal.second.

In general, from 0.005% to 1% by weight of polyol, and preferably from 0.01% to 0.6%, is used, relative to the polymer to be stabilized.

It has been found that polyols having more than 4 hydroxyl groups in their molecular structure afford particularly satisfactory results.

Thus, polyols such as sorbitol, mannitol and xylitol are particularly effective according to the invention, even when used in small amounts. Thus, although these compounds are preferably used in amounts ranging from 0.01% to 0.25% by weight, relative to the polymer, an improvement in the stabilization of the polymeric compositions in which they are present is already distinct, and no coloration side effect is observed, at proportions as low as 0.005% to 0.01% by weight, relative to the polymer.

The thiomalic acid diesters used according to the invention are easily obtained by the esterification of thiomalic acid with various monohydroxylated or dihydroxylated compounds. Among such hydroxylated compounds, the following are particularly representative:

(A") if the thiomalic acid diesters correspond to the general formula (I), the radicals $R_1$ and $R_2$ are derived from monohydroxylated compounds $R_1$—OH and/or $R_2$—OH, such as, for example:
  (a) octyl, decyl, dodecyl, tridecyl, tetradecyl, hexadecyl, octadecyl, eicosyl, tetracosyl, triacontyl and hexatriacontyl alcohols, or mixtures of $C_{11}$ to $C_{15}$ alcohols (such as those marketed under the trademark SYNPROL);
  (b) cyclohexanol, substituted or unsubstituted benzyl alcohol, phenylethyl alcohols and β-phenoxyethyl alcohols; and
  (c) 2-mercaptoethanol, 2-butoxyethanol, 2-ethoxy ethanol, 2-(2-n-butoxyethoxy)-ethanol and 2-(2-ethoxyethoxy)-ethanol; or (B") if the thiomalic acid diesters correspond to the general formula (II), the divalent radical R' is derived from a dihydroxylated compound or from a mixture of dihydroxylated compounds of the formula: HO—R'—OH, such as, for example:
  (a) aliphatic diols such as ethylene glycol, propane-1,2-diol, propane-1,3-diol, butane-1,2-diol, butane-1,3-diol, butane-1,4-diol, butane-2,3-diol, pentane-1,5-diol, 2,2-dimethylpropane-1,3-diol, 2,2-diethylpropane-1,3-diol, 2-methyl-2-propylpropane-1,3-diol, 2-ethylhexane-1,3-diol, hexane-1,6-diol, 2,2,4-trimethylpentane-1,3-diol, decanediols, dodecanediols, pentadecanediols, octadecanediols, eicosanediols, tetracosanediols and 2,2'-thiodiethanol;
  (b) certain polyol esters such as 2,2-dimethylpropane-1,3-diol mono-(hydroxypivalate) or glyceryl monostearate;
  (c) cyclic diols such as 1,2-bis-(hydroxymethyl) cyclohexane, 1,3-bis-(hydroxymethyl)-cyclohexane, 1,4-bis (hydroxymethyl)-cyclohexane, 1,4-dihydroxycyclohexane, 1,4-bis-(hydroxymethyl)-benzene, hydrogenated bisphenol A, 2,2-bis-[4-(2-hydroxyethoxy)-phenyl]-propane (or BHEPP) and 2,2-bis-[4-(2-hydroxypropoxy)-phenyl]-propane (or BHPPP);
  (d) polyethers containing hydroxyl end groups, such as polyethylene glycols and polypropylene glycols of low molecular weight (for example, of less than 600); and
  (e) linear polyesters containing hydroxyl end groups and having a low molecular weight (for example, of less than 600).

If thiomalic diesters of the formula (II) are prepared by reacting thiomalic acid with a dihydroxylated compound HO—R'—OH, it is quite obvious that it is necessary to use an excess of diol such as to obtain, in known manner, compounds of the formula (II) having hydroxyl end groups and the desired average number n of recurring units

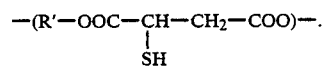

In general, (n+1) mols of dihydroxylated compounds are used per n mols of thiomalic acid, n most frequently being an integer ranging from 1 to 10.

As a means for carrying out the process according to the invention, another object of the invention consists of a mixture of (i) at least one organic derivative of zinc, (ii) at least one organic derivative of a metal from Group IIa of the Periodic Table, and (iii) at least one thiomalic acid diester.

Such mixtures can be prepared in any proportions; in general, the proportions by weight of the various constituents are such that the admixture comprises:
  (i) from 5 to 40% of organozinc derivative;
  (ii) from 5 to 90% of organic derivative of a metal from Group IIa of the Periodic Table; and
  (iii) from 5 to 90% of thiomalic acid diester.

Finally, the invention also relates to the stabilized compositions, per se, based on polyvinyl chloride which are obtained according to the invention.

By the expression "composition based on polyvinyl chloride", there are intended compositions containing a vinyl chloride homopolymer, a copolymer of vinyl chloride with various other monomers, or a mixture of polymers or copolymers, a major part of which, e.g., in excess of 50%, comprises vinyl chloride.

In general, any type of vinyl chloride homopolymer is suitable, irrespective of its method of preparation: bulk polymerization, suspension polymerization, dispersion polymerization or any other type of polymerization, and irrespective of its intrinsic viscosity.

The vinyl chloride homopolymers can be chemically modified, such as, for example, chlorinated vinyl chloride polymers.

Many vinyl chloride copolymers can also be stabilized against the effects of heat, namely, yellowing and degradation. Same include copolymers obtained by the copolymerization of vinyl chloride with other monomers having a polymerizable ethylenic bond, such as, for example, vinyl esters such as vinyl acetate; vinylidene chloride; maleic or fumaric acids (or their esters); olefins such as ethylene, propylene or hexene; acrylic acid esters; styrene; or vinyl ethers such as n-vinyldodecyl ether.

These copolymers usually contain at least 50% by weight of vinyl chloride units. However, the invention is applied with particularly good results to copolymers containing at least 80% by weight of vinyl chloride units.

The invention is also applied with good results to mixtures of polymers containing minor amounts of other polymers such as halogen-containing polyolefins or acrylonitrile/ butadiene/styrene copolymers, or to mixtures of homopolymers or copolymers such as defined above.

These compositions can be either "rigid" or "flexible". If "rigid" compositions are used, they can then contain impact strength modifiers, pigments and/or fillers, and lubricants to assist their processing, in addition to the polymer and the various stabilizers or adjuvants.

If "flexible" compositions are used, they can contain primary or secondary plasticizers, pigments and/or fillers, lubricants and the like, in addition to the polymer and the various stabilizers or adjuvants These stabilizers are essentially antioxidants, "light" or UV stabilizers and also other compounds known for their effect on heat stabilization, such as, for example, epoxides, phosphites and phenol compounds.

These epoxides are generally complex compounds and are usually epoxidized polyglycerides such as epoxidized soya pil, epoxidized linseed oil, epoxidized fish oil or epoxidized tall oil, epoxidized fatty acid esters, epoxidized hydrocarbons, such as epoxidized polybutadiene, or epoxidized ethers.

Various alkyl or aryl phosphites are also known for their stabilizing activity, such as, for example, phenyl 2-ethylhexyl phosphite, triisodecyl phosphite or diisooctyl pentaerythrityl diphosphite.

Phenolic compounds have also been used as heat stabilizers: these are mainly butylhydroxytoluene BHT) and other substituted phenols.

It is self-evident that the invention is not exceeded by adding, to the stabilizers claimed, small amounts of additional stabilizers which are now well known to those skilled in the art such as, for example, β-diketone compounds, organic nitrogen compounds such as β-aminocrotonic acid esters, alphaphenylindole derivatives or substituted dihydropyridine derivatives, or sulfur compounds, such as thioglycolic acid esters.

The three stabilizers used according to the invention can be incorporated at the same time as the other adjuvants. They can also be mixed with one another or with certain of the adjuvants. The stabilizing composition will then subsequently be incorporated into the polymer. All the customary methods known in this field are suitable for mixing the ingredients. However, the homogenization of the final composition can advantageously be carried out on a malaxator or mixing rolls at a temperature such that the composition becomes fluid, normally at between 150 and 200° C. for PVC, and for a sufficient time to provide good homogenization, namely, approximately from 3 to 20 minutes.

The stabilized compositions based on polyvinyl chloride, according to the invention, can be processed by all of the techniques normally used for working compositions of PVC and of its copolymers, for example: injection molding; extrusion; blow extrusion; calendering; and rotational molding.

The stabilization process according to the invention makes it possible to considerably retard, if not completely suppress, the appearance of yellowing during the period in which the processed composition based on polyvinyl chloride is heated to 180° C. or above, and to obtain transparent, colorless and homogeneous finished products which do not exhibit exudation.

In order to further illustrate the present invention and the advantages thereof, the following specific examples are given, it being understood that same are intended only as illustrative and in nowise limitative.

In said examples which follow, the subject compositions were prepared by placing the various constituents thereof in powder form, or, if appropriate, in liquid form, in a rapid mixer, which was rotated under cold conditions for such time necessary as to provide good homogenization, typically at least 5 minutes.

These homogeneous compositions were then used to prepare 1 mm thick plates by means of malaxation in a 2-roll mixer, at a temperature of 160 to 200° C., for three or four minutes, and approximately 1 x 2 cm rectangular test-pieces were cut from these plates and placed in a ventilated oven at 180° C. for varying periods of time.

The coloration of the samples was then determined by comparison with a Lovibond disc on the Gardner scale.

EXAMPLES 1 to 19

The following base composition A was prepared:
(i) 2,000 g of PVC powder characterized by a viscosity index of 124 according to French Standard Specification T 51,013 and a K value of 70, obtained by suspension polymerization and marketed under the registered trademark CORVIC S 71/102;
(ii) 960 g of dioctyl phthalate;
(iii) 40 g of epoxidized soya oil;
(iv) 4 g of a polyethylene wax lubricant;
(v) 1.8 g of Zn 2-ethylhexanoate; and
(vi) 10 g of barium para-tert.-butylbenzoate. 19 Fractions of the composition A, each weighing 150.8 g, were taken (each fraction contained 100 g of PVC).

A certain amount of one of the following thiomalates was added to each fraction:
(1) Neopentylglycol thiomalate (TM) (in the formula (II) of which n=2 on average, obtained by the condensation of 2 mols of thiomalic acid with 3 mols of neopentylglycol);
(2) 2-Ethylhexyl TM;
(3) Cyclohexyl TM; or
(4) Benzyl TM.

These various compositions, and also the unmodified composition A, were used to prepare one millimeter thick sheets by malaxation in a 2-roll mixer for 3 minutes at 180° C. The heat-aging test was carried out on the test pieces in an oven at 180° C. for varying periods of time.

Table I below reports the respective Gardner coloration indices determined as a function of the aging time.

TABLE I

| Example | Stabilizers added (weight in grams) | Gardner indices as a function of time Time in minutes | | | | | | |
|---|---|---|---|---|---|---|---|---|
| | | 0 | 7 | 14 | 21 | 30 | 40 | 55 |
| Control | composition A by itself | 0 | 0.5 | 1 | 2 | 3 | 3.5 | 4 Black after 98 min. |
| 1 | Neopentylglycol TM 0.30 | 0 | 0 | 0 | 0 | 0 | 0.5 | 1 Edges brown after 130 min. |
| 2 | Neopentylglycol TM 0.40 | 0 | 0 | 0 | 0 | 0 | 0 | 0.5 9 after 130 min. |
| 3 | neopentylglycol TM 0.60 | 0 | 0 | 0 | 0 | 0 | 0 | 0.5 5 after 130 min. |
| 4 | Neopentylglycol TM 0.80 | 0 | 0 | 0 | 0 | 0 | 0 | 0 3 after 130 min. |

TABLE I-continued

| Example | Stabilizers added (weight in grams) | | Gardner indices as a function of time Time in minutes | | | | | | |
|---|---|---|---|---|---|---|---|---|---|
| | | | 0 | 7 | 14 | 21 | 30 | 40 | 55 |
| 5 | 2-Ethylhexyl TM | 0.20 | 0 | 0 | 0 | 0 | 0 | 1 | 1.5 Black after 116 min. |
| 6 | 2-Ethylhexyl TM | 0.30 | 0 | 0 | 0 | 0 | 0 | 0.5 | 1 Black after 115 min. |
| 7 | 2-Ethylhexyl TM | 0.40 | 0 | 0 | 0 | 0 | 0 | 0 | 0.5 Black after 112 min. |
| 8 | 2-Ethylhexyl TM | 0.60 | 0 | 0 | 0 | 0 | 0 | 0 | 0.5 Black after 110 min. |
| 9 | 2-Ethylhexyl TM | 0.80 | 0 | 0 | 0 | 0 | 0 | 0 | 0.5 Black after 107 min. |
| 10 | Cyclohexyl TM | 0.20 | 0 | 0 | 0 | 0 | 0 | 0.5 | 1.5 Black after 110 min. |
| 11 | Cyclohexyl TM | 0.30 | 0 | 0 | 0 | 0 | 0 | 0.5 | 1 Black after 109 min. |
| 12 | Cyclohexyl TM | 0.40 | 0 | 0 | 0 | 0 | 0 | 0 | 0.5 Black after 109 min. |
| 13 | Cyclohexyl TM | 0.60 | 0 | 0 | 0 | 0 | 0 | 0 | 0.5 Black after 108 min. |
| 14 | Cyclohexyl TM | 0.80 | 0 | 0 | 0 | 0 | 0 | 0 | 0.5 Black after 108 min. |
| 15 | Benzyl TM | 0.20 | 0 | 0 | 0 | 0 | 0.5 | 1 | 2 Black after 103 min. |
| 16 | Benzyl TM | 0.30 | 0 | 0 | 0 | 0 | 0 | 0.5 | 1 Black after 106 min. |
| 17 | Benzyl TM | 0.40 | 0 | 0 | 0 | 0 | 0 | 0 | 0.5 Black after 106 min. |
| 18 | Benzyl TM | 0.60 | 0 | 0 | 0 | 0 | 0 | 0 | 0 Black after 108 min. |
| 19 | Benzyl TM | 0.80 | 0 | 0 | 0 | 0 | 0 | 0 | 0 Black after 111 min. |

EXAMPLES 20 to 31

The following base composition B was prepared:
(i) 2,000 g of PVC powder characterized by a viscosity index of 80 according to French Standard Specification T 51,013, obtained by suspension polymerization and marketed under the registered trademark LUCO-VYL RS 800;
(ii) 20 g of an additive for increasing impact strength (butadiene)/styrene/methyl methacrylate copolymer);
(iii) 20 g of lubricant marketed under the trademark CIRE E (wax based on colophony ester);
(iv) 60 g of epoxidized soya oil;
(v) 2.4 g of zinc 2-ethylhexanoate; and
(vi) 8 g of calcium stearate.

12 Fractions of the composition B, each weighing 114.5 g, were taken (each fraction contained 100 g of PVC).

A certain amount of one of the following thiomalates was added to each fraction:
(1) 2-Ethylhexyl TM;
(2) Cyclohexyl TM;
(3) Neopentylglycol TM (obtained by the condensation of 3 mols of neopentylglycol with 2 mols of thiomalic acid); or
(4) Benzyl TM.

These various compositions, and also the unmodified composition B, were used to prepare approximately one millimeter thick sheets by malaxation on a 2-roll mixer for 3 minutes at 180° C.

The heat-aging test was carried out on the test pieces at 180° C.

Table II below reports the respective Gardner coloration indices determined as a function of the aging time.

TABLE II

| Example | Stabilizers added (weight in grams) | | Gardner indices as a function of time Time in minutes | | | | | | |
|---|---|---|---|---|---|---|---|---|---|
| | | | 0 | 7 | 14 | 21 | 30 | 40 | 55 |
| Control | Composition B by itself | | 3* | 10 | 10 | 10 | 10 | 10.5 | 11 Black after 68 min. |
| 20 | 2-Ethylhexyl TM | 0.30 | 0 | 0 | 4 | 7 | 9 | 9.5 | 10 Brown spots |

TABLE II-continued

| Example | Stabilizers added (weight in grams) | | Gardner indices as a function of time Time in minutes | | | | | | |
|---|---|---|---|---|---|---|---|---|---|
| | | | 0 | 7 | 14 | 21 | 30 | 40 | 55 |
| 21 | 2-Ethylhexyl TM | 0.60 | 0 | 0 | 0.5 | 5 | 7 | 8 | 10 Brown after 70 min. |
| 22 | 2-Ethylhexyl TM | 1.00 | 0 | 0 | 0.5 | 3 | 6 | 7 | 10 Black after 70 min. |
| 23 | Cyclohexyl TM | 0.30 | 0 | 0 | 2 | 6 | 8 | 9 | 10 Black after 70 min. |
| 24 | Cyclohexyl TM | 0.60 | 0 | 0 | 0.5 | 4 | 7 | 9 | 10 Black after 68 min. |
| 25 | Cyclohexyl TM | 1.00 | 0 | 0 | 0 | 2 | 4 | 7 | 10 Black after 65 min. |
| 26 | Neopentylglycol TM | 0.30 | 0 | 0 | 4 | 7 | 9 | 10 | 11 Brown after 70 min. |
| 27 | Neopentylglycol TM | 0.60 | 0 | 0 | 0.5 | 4 | 8 | 9 | 10 Brown after 70 min. |
| 28 | Neopentylglycol TM | 1.00 | 0 | 0 | 0 | 1 | 4 | 7 | 9 Brown after 70 min. |
| 29 | Benzyl TM | 0.30 | 0 | 0 | 3 | 6 | 8 | 9 | 10 Black after 70 min. |
| 30 | Benzyl TM | 0.60 | 0 | 0 | 0.5 | 4 | 7 | 8 | 9 Black after 68 min. |
| 31 | Benzyl TM | 1.00 | 0 | 0 | 0.5 | 2 | 5 | 6 | 9 Black after 64 min. |

*pink coloration

EXAMPLES 32 to 50

The following composition C was prepared:
(i) 2,000 g of PVC powder characterized by a viscosity index of 95 according to French Standard Specification T 51,013, obtained by bulk polymerization and marketed under the registered trademark LUCOVYL GB 9550;
(ii) 1,000 g of dioctyl phthalate;
(iii) 30 g of epoxidized soya oil;
(iv) 0.6 g of sorbitol;
(v) 3.6 g of calcium stearate; and
(vi) 1.8 g of zinc stearate.

19 Fractions of the composition C, each weighing 151.8 g, were taken (each fraction contained 100 g of PVC).

A certain amount of one of the following thiomalates was added to each fraction:
(1) 2-Ethylhexyl TM;
(2) Cyclohexyl TM;
(3) Neopentylglycol TM (obtained by the condensation of 3 mols of neopentylglycol with 2 mols of thiomalic acid); or
(4) Benzyl TM.

These various compositions, and also the unmodified composition C, were used to prepare one millimeter thick sheets by malaxation in a 2-roll mixer for 4 minutes at 160° C.

The heat-aging test was carried out on the test pieces at 180° C.

Table III below reports the respective Gardner coloration indices determined as a function of the aging time.

TABLE III

| Example | Stabilizers added (weight in grams) | Time in minutes | Gardener indicates as a function of time | | | | | | |
|---|---|---|---|---|---|---|---|---|---|
| | | | 0 | 7 | 14 | 21 | 40 | 55 | |
| Control C | Composition C by itself | | 0.5* | 2* | 4* | 6 | 9 | 10 | Black after 51 min. |
| 32 | Neopentylglycol TM | 0.30 | 0 | 0 | 0 | 0.5 | 1 | 2 | 4 Brown after 80 min. |
| 33 | Neopentylglycol TM | 0.40 | 0 | 0 | 0 | 0 | 0.5 | 1 | 2 Edges brown after 80 min. |
| 34 | Neopentylglycol TM | 0.60 | 0 | 0 | 0 | 0 | 0 | 0 | 0.5 3 after 80 min. |
| 35 | Neopentylglycol TM | 0.80 | 0 | 0 | 0 | 0 | 0 | 0 | 0.5 2.5 after |

TABLE III-continued

| Example | Stabilizers added (weight in grams) | Time in minutes | Gardener indicates as a function of time | | | | | | |
|---|---|---|---|---|---|---|---|---|---|
| | | | 0 | 7 | 14 | 21 | 40 | 55 | |
| 36 | 2-Ethylhexyl TM | 0.20 | 0 | 0 | 0 | 0 | 2 | 5 | 9 / 80 min. Black after |
| 37 | 2-Ethylhexyl TM | 0.30 | 0 | 0 | 0 | 0 | 1 | 2 | 7 / 65 min. Black after |
| 38 | 2-Ethylhexyl TM | 0.40 | 0 | 0 | 0 | 0 | 0 | 1 | 5 / 67 min. Black after |
| 39 | 2-Ethylhexyl TM | 0.60 | 0 | 0 | 0 | 0 | 0 | 0.5 | 1 / 69 min. Black after |
| 40 | 2-Ethylhexyl TM | 0.80 | 0 | 0 | 0 | 0 | 0 | 0 | 0.5 / 70 min. Black after |
| 41 | Cyclohexyl TM | 0.20 | 0 | 0 | 0 | 0 | 1 | 4 | 9 / 72 min. Black after |
| 42 | Cyclohexyl TM | 0.30 | 0 | 0 | 0 | 0 | 0 | 2 | 6 / 66 min. Black after |
| 43 | Cyclohexyl TM | 0.40 | 0 | 0 | 0 | 0 | 0 | 1 | 3 / 68 min. Black after |
| 44 | Cyclohexyl TM | 0.60 | 0 | 0 | 0 | 0 | 0 | 0 | 1 / 70 min. Black after |
| 45 | Cyclohexyl TM | 0.80 | 0 | 0 | 0 | 0 | 0 | 0 | 0.5 / 72 min. Black after |
| 46 | Benzyl TM | 0.20 | 0 | 0 | 0 | 0 | 2 | 6 | 10 Edges brown / 74 min. Black after |
| 47 | Benzyl TM | 0.30 | 0 | 0 | 0 | 0 | 0 | 3 | 7 / 60 min. Black after |
| 48 | Benzyl TM | 0.40 | 0 | 0 | 0 | 0 | 0 | 0.5 | 4 / 64 min. Black after |
| 49 | Benzyl TM | 0.60 | 0 | 0 | 0 | 0 | 0 | 0 | 1 / 66 min. Black after |
| 50 | Benzyl TM | 0.80 | 0 | 0 | 0 | 0 | 0 | 0 | 0.5 / 67 min. Black after 67 min. |

*pink coloration

EXAMPLES 51 to 65

The following composition D was prepared:
(i) 3,000 g of PVC powder characterized by a viscosity index of 95 according to French Standard Specification T 51,013, obtained by bulk polymerization and marketed under the registered trademark LUCOVYL GB 9550;
(ii) 1,500 g of dioctyl phthalate;
(iii) 45 g of epoxidized soya oil; and
(iv) 0.9 g of sorbitol.

30 Fractions of the composition D, each weighing 151.53 g, were taken (each fraction contained 100 g of PVC).

A certain amount of one of the following materials was added to each fraction:

(1) Either an organic derivative of zinc, an organic derivative of a metal of Group IIa of the Periodic Table, and a thiomalate: experiment according to the invention; or
(2) Only an organic derivative of zinc and an organic derivative of a metal of Group IIa of the Periodic Table: comparative experiment, which bears the same number as the corresponding experiment according to the invention, but which is given the letter a.

These various compositions were used to prepare one millimeter thick sheets by malaxation in a 2-roll mixer for 4 minutes at 160° C.

The heat-aging test was carried out on the test pieces at 180° C.

Table IV below reports the respective Gardner coloration indices determined as a function of the aging time.

TABLE IV

| Example | Stabilizers added (weight in grams) | Time in minutes | Gardner indices as a function of time | | | | |
|---|---|---|---|---|---|---|---|
| | | | 0 | 7 | 14 | 21 | 40 |
| 51a | Calcium stearate<br>Zinc para-tert.-butylbenzoate | 0.30<br>0.09 | 0 | 0.5* | 2* | 5 | 9 Edges black / Black after 44 min. |

TABLE IV-continued

| Example | Stabilizers added (weight in grams) | | Time in minutes | Gardner indices as a function of time | | | | | | |
|---|---|---|---|---|---|---|---|---|---|---|
| | | | | 0 | 7 | 14 | 21 | 35 | 40 | |
| 51 | Calcium stearate<br>Zinc para-tert.-butylbenzoate<br>2-Ethylhexyl TM | 0.30<br>0.09<br>0.60 | | 0 | 0 | 0 | 0 | 0 | 0.5 | 2 after 50 min. | Edges, black after 55 min. |
| 52a | Calcium para-tert.-butylbenzoate<br>Zinc para-tert.-butylbenzoate | 0.25<br>0.09 | | 0 | 1* | 2* | 6 | 10 | Brown | Black after 43 min. |
| 52 | Calcium para-tert.-butylbenzoate<br>Zinc para-tert.-butylbenzoate<br>2-Ethylhexyl TM | 0.25<br>0.09<br>0.60 | | 0 | 0 | 0 | 0 | 1 | 3.5 | Black after 49 min. |
| 53a | Barium para-tert.-butylbenzoate<br>Zinc stearate | 0.40<br>0.09 | | 0 | 0.5* | 2* | 3* | 2.5 | Edges brown | Black after 45 min. |
| 53 | Barium para-tert.-butylbenzoate<br>Zinc stearate<br>2-Ethylhexyl TM | 0.40<br>0.09<br>0.60 | | 0 | 0 | 0 | 0 | 0 | 0 | Edges brown after 50 min. | Black after 55 min. |
| 54a | Barium stearate<br>Zinc para-tert.-butylbenzoate | 0.45<br>0.09 | | 0 | 1* | 3* | 4 | 3.5 | 3 | Black after 50 min. |
| 54 | Barium stearate<br>Zinc para-tert.-butylbenzoate<br>2-Ethylhexyl TM | 0.45<br>0.09<br>0.60 | | 0 | 0 | 0 | 0 | 0 | Edges brown | Black after 45 min. |

| Example | Stabilizers added (weight in grams) | | Time in minutes | Gardner indices as a function of time | | | | | | |
|---|---|---|---|---|---|---|---|---|---|---|
| | | | | 0 | 7 | 14 | 21 | 35 | 40 | |
| 55a | Magnesium stearate<br>Zinc para-tert.-butylbenzoate | 0.50<br>0.09 | | 0 | 0 | 2 | 5 | Black after 32 min. | | |
| 55 | Magnesium stearate<br>Zinc para-tert.-butylbenzoate<br>2-Ethylhexyl TM | 0.50<br>0.09<br>0.60 | | 0 | 0 | 0 | 0 | 11 Edges brown | Black after 39 min. | |

| | | | | 0 | 7 | 14 | 21 | 30 | 40 | |
|---|---|---|---|---|---|---|---|---|---|---|
| 56a | Calcium para-tert.-butylbenzoate<br>Zinc para-tert.-butylbenzoate | 0.18<br>0.10 | | 0 | 1* | 3* | 4 | 6 | 8 | Black after 45 min. |
| 56 | Calcium para-tert.-butylbenzoate<br>Zinc para-tert.-butylbenzoate<br>2-Ethylhexyl TM | 0.18<br>0.10<br>0.60 | | 0 | 0 | 0 | 0 | 0.5 | 3 (edges brown) | Black after 44 min. |
| 57a | Barium para-tert.-butylbenzoate<br>Zinc stearate | 0.24<br>0.09 | | 0 | 0.5* | 3* | 3 | 3 | 4 | Black after 48 min. |
| 57 | Barium para-tert.-butylbenzoate<br>Zinc stearate<br>2-Ethylhexyl TM | 0.24<br>0.09<br>0.60 | | 0 | 0 | 0 | 0 | 0 | 0 | Black after 49 min. |
| 58a | Barium para-tert.-butylbenzoate<br>Zinc 2-ethylhexanoate | 0.24<br>0.44 | | 0 | 0.5* | 3* | 4 | 5 | 5 | Brown after 50 min. | Black after 52 min. |
| 58 | Barium para-tert.-butylbenzoate<br>Zinc 2-ethylhexanoate<br>2-Ethylhexyl TM | 0.24<br>0.44<br>0.60 | | 0 | 0 | 0 | 0 | 0 | 0 | Edges brown | Black after 56 min. |
| 59a | Barium stearate<br>Zinc para-tert.-butylbenzoate | 0.24<br>0.10 | | 0 | 0.5* | 1* | 2.5 | 3 | Black after 35 min. | |
| 59 | Barium stearate<br>Zinc para-tert.-butylbenzoate<br>2-Ethylhexyl TM | 0.24<br>0.10<br>0.60 | | 0 | 0 | 0 | 0 | 0.5 | Black after 33 min. | |
| 60a | Magnesium stearate<br>Zinc para-tert.-butylbenzoate | 0.24<br>0.10 | | 0 | 0.5 | 1 | 4 | Black | | |
| 60 | Magnesium stearate<br>Zinc para-tert.-butylbenzoate<br>2-Ethylhexyl TM | 0.24<br>0.10 | | 0 | 0 | 0 | 0 | Black | | |
| 61a | Calcium stearate<br>Zinc stearate | 0.18<br>0.09 | | 0 | 1* | 3* | 6 | 8 | 8.5 | 9 | Black after 56 min. |
| 61 | Calcium stearate<br>Zinc stearate<br>2-Ethylhexyl TM | 0.18<br>0.09<br>0.60 | | 0 | 0 | 0 | 0 | 0 | 0 | 0.5 | Black after 75 min. |

TABLE IV-continued

| | | | | | | | | | | |
|---|---|---|---|---|---|---|---|---|---|---|
| 62a | Calcium stearate<br>Zinc para-tert.-butylbenzoate | 0.18<br>0.10 | 0 | 0.5* | 3* | 4 | 6 | | | Black after 39 min. |
| 62 | Calcium stearate<br>Para-tert.-butylbenzoate<br>2-Ethylhexyl TM | 0.18<br>0.10<br>0.60 | 0 | 0 | 0 | 0 | 0 | 2.5 (edges brown) | Black after 44 min. | |
| 63a | Calcium stearate<br>Zinc nonylphenate | 0.18<br>0.09 | 0 | 4* | 6* | 11 | 11 | 11 | 11 | Black after 59 min. |
| 63 | Calcium stearate<br>Zinc nonylphenate<br>2-Ethylhexyol TM | 0.18<br>0.09<br>0.60 | 0 | 0 | 0 | 0 | 0.5 | 1.5 | 2.5 | Edges brown after 90 min. 90 min. |
| 64a | Calcium stearate<br>Zinc salt of isooctyl 2-mercaptoacetate | 0.18<br>0.09 | 0 | 0 | 1 | 3 | 10 | 10 | 10 | Black after 65 min. |
| 64 | Calcium stearate<br>zinc salt of isooctyl 2-mercaptoacetate<br>2-Ethylhexyl TM | 0.18<br>0.09<br>0.60 | 0 | 0 | 0 | 0 | 0 | 0.5 | 1 | Brown after 80 min. |
| 65a | Calcium para-tert.-butylbenzoate<br>Zinc stearate | 0.18<br>0.09 | 0 | 0 | 1.5 | 4 | 9 | 9.5 | 10 | Black after 61 min. |
| 65 | Calcium para-tert.-butylbenzoate<br>Zinc stearate<br>2-Ethylhexyl TM | 0.18<br>0.09<br>0.60 | 0 | 0 | 0 | 0 | 0 | 0.5 | 0.5 | Edges brown after 90 min. |

*pink coloration

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

WHAT IS CLAIMED IS:

1. A stabilized polymeric composition of matter, comprising a vinyl chloride based polymer, and a stabilizing amount therefor of (i) at least one organozinc derivative, (ii) at least one organic derivative of a metal from Group IIa of the Periodic Table, and (iii) at least one thiomalic acid diester.

2. The stabilized composition of matter as defined by claim 1, said at least one thiomalic acid diester (iii) having the general formula (I):

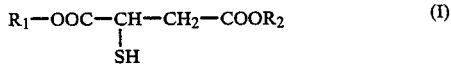

in which the radicals $R_1$ and $R_2$, which are identical or different, represent:
(a) a linear or branched chain aliphatic hydrocarbon radical which is saturated or contains one or more units of ethylenic unsaturation and which can contain one or more oxygen atoms —O— or sulfur atoms —S—;
(b) a monocyclic or polycyclic cycloaliphatic or cycloaliphatic-aliphatic hydrocarbon radical in which the cyclic moiety optionally bears one or more alkyl or alkoxy substituents, can contain one or more units of ethylenic unsaturation and can be bonded to the aliphatic moiety via an oxygen atom —O—;
(c) an arylaliphatic hydrocarbon radical in which the cyclic moiety optionally bears one or more alkyl or alkoxy substituents and can be bonded to the aliphatic moiety via an oxygen atom —O—; or
(d) a sequence of a plurality of the aforementioned radicals;
or having the general formula (II):

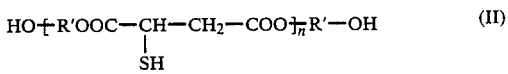

in which: n is an integer ranging from 1 to 10 and R' represents:
(a) a linear or branched chain divalent aliphatic hydrocarbon radical which is saturated or contains one or more units of ethylenic unsaturation, and which can contain one or more oxygen atoms —O— or sulfur atoms —S— or one or more of the groups —COO—;
(b) a monocyclic or polycyclic cycloaliphatic or cycloaliphatic-aliphatic divalent hydrocarbon radical in which the cyclic moiety optionally bears one or more alkyl or alkoxy substituents, can contain one or more units of ethylenic unsaturation and can be bonded to the aliphatic moiety via an oxygen atom —O—;
(c) a divalent arylaliphatic hydrocarbon radical in which the cyclic moiety optionally bears one or more alkyl or alkoxy substituents and can be bonded to the aliphatic moiety via an oxygen atom —O—; or
(d) a sequence of a plurality of the aforementioned radicals.

3. The stabilized composition of matter as defined by claim 2, said at least one or9anozinc derivative (i) comprising a carboxylic acid salt, a phenolate, a mercaptide or a chelate of a β-dicarbonyl compound; said at least one organic derivative of a Group IIa metal (ii) comprising a carboxylic acid salt, a phenolate, a mercaptide or a chelate of a β-dicarbonyl compound of calcium, magnesium, barium or strontium; and said at least one thiomalic acid diester (iii) either having the formula (I)

in which $R_1$ and $R_2$ are either identical or different and represent:
  (a) a linear or branched chain aliphatic hydrocarbon radical which is saturated or contains one or more units of ethylenic unsaturation, which has from 2 to 36 carbon atoms and which can contain one or more oxygen atoms —O— or sulfur atoms —S—;
  (b) a cycloaliphatic hydrocarbon radical comprising one or more rings, the ring or rings having a total of 5 to 12 carbon atoms and being optionally substituted by one or more alkyl or alkoxy radicals having 1 to 6 carbon atoms;
  (c) a cycloalkyl-aliphatic or cycloalkenyl aliphatic hydrocarbon radical comprising one or more rings having a total of 5 to 12 carbon atoms, and of an aliphatic hydrocarbon which has 1 to 6 carbon atoms and can be bonded to the cyclic moiety via an oxygen atom —O—;
  (d) an arylaliphatic hydrocarbon radical, the cyclic moiety of which is optionally substituted by one or more alkyl radicals having from 1 to 12 carbon atoms or alkoxy radicals having 1 to 6 carbon atoms, and the aliphatic moiety of which has 1 to 6 carbon atoms and can be bonded to the cyclic moiety via an oxygen atom —O—; or
  (e) a sequence of a plurality of the aforementioned radicals;

or has the formula (II) in which:
n is an integer ranging from 1 to 6 and
$R'$ represents:
  (a) a linear or branched chain divalent aliphatic hydrocarbon radical which is saturated or contains one or more units of ethylenic unsaturation, which has from 2 to 24 carbon atoms and which can contain one or more oxygen atoms —O— or sulfur atoms —S—;
  (b) a radical —$R_3$—COO—$R_4$—, $R_3$ and $R_4$, which are identical or different, being linear or branched chain aliphatic divalent hydrocarbon radicals which are saturated or contain one or more units of ethylenic unsaturation, $R_3$ having from 1 to 18 carbon atoms and $R_4$ having from 2 to 18 carbon atoms;
  (c) a divalent cycloaliphatic hydrocarbon radical comprising one or more rings which have a total of 5 to 12 carbon atoms and can be substituted by one or more alkyl or alkoxy radicals having from 1 to 6 carbon atoms;
  (d) a divalent cycloalkylene-alkylene, cycloalkylene-dialkylene, cycloalkenylene-alkylene or cycloalkenylene-dialkylene radical which contains one or more rings which have a total of 5 to 12 carbon atoms and can be substituted by one or more alkyl or alkoxy radicals having 1 to 6 carbon atoms, and the aliphatic moieties of which have 56 from 1 to 6 carbon atoms and can be bonded to the ring via an oxygen atom —O—;
  (e) a phenylenedialkylene radical, the ring of which optionally being substituted by one or more alkyl or alkoxy radicals having from 1 to 6 carbon atoms, and the aliphatic moieties of which can be bonded to the ring via an oxygen atom —O—; or
  (f) a sequence of a plurality of the aforementioned radicals.

4. The stabilized composition of matter as defined by claim 3, said at least one thiomalic acid diester (iii) either having the formula (I) in which $R_1$ and $R_2$ are either identical or different and represent:
  (a) a linear or branched chain monovalent aliphatic hydrocarbon radical which is saturated or contains one or more units of ethylenic unsaturation, which has from 4 to 36 carbon atoms and can contain one or more oxygen atoms —O— or sulfur atoms —S—;
  (b) a cyclohexyl or cyclohexyl-alkyl radical, the ring of which is optionally substituted by one or more alkyl or alkoxy radicals having 1 to 6 carbon atoms, and the aliphatic moiety of which, if present, contains from 1 to 6 carbon atoms and can be bonded to the ring via an oxygen atom —O—;
  (c) a phenylalkyl radical, the ring of which is optionally substituted by one or more alkyl or alkoxy radicals having 1 to 6 carbon atoms, and the aliphatic moiety of which contains from 1 to 6 carbon atoms and can be bonded to the ring via an oxygen atom —O—; or
  (d) a sequence of a plurality of the aforementioned radicals;

or has the formula (II) in which:
n is an integer ranging from 1 to 4 and
$R'$ represents:
  (a) a linear or branched chain alkylene radical having from 2 to 24 carbon atoms;
  (b) a radical —$R_3$—COO—R, $R_3$ and $R_4$, which are identical or different, being linear or branched chain aliphatic hydrocarbon radicals which are saturated or contain one or more units of ethylenic unsaturation, $R_3$ having from 1 to 18 carbon atoms and $R_4$ having from 2 to 18 carbon atoms;
  (c) a cyclohexylene radical, a cyclohexylenealkylene radical or acyclohexylene-dialkylene radical, the ring of which is optionally substituted by one or more alkyl or alkoxy radicals having 1 to 6 carbon atoms, and the aliphatic moieties of which, if present, contain from 1 to 6 carbon atoms and can be bonded to the ring via an oxygen atom —O—;
  (d) a tricyclo$(5,2,1,0^{2,6})$decane-4,8-dimethylene radical;
  (e) a phenylenedialkylene radical, the ring of which is optionally substituted by one or more alkyl or alkoxy radicals having from 1 to 6 carbon atoms, and the aliphatic moieties of which contain from 1 to 6 carbon atoms and can be bonded to the ring via an oxygen atom —O—; or
  (f) a sequence of a plurality of the aforementioned radicals.

5. The stabilized composition of matter as defined by claim 2, said at least one organozinc derivative (i) comprising at least one carboxylic acid salt, phenate, or admixture thereof.

6. The stabilized composition of matter as defined by claim 2, said at least one organic derivative of a Group IIa metal (ii) comprising at least one carboxylic acid salt, phenate, or admixture thereof.

7. The stabilized composition of matter as defined by claim 2, said at least one organic derivative of a Group IIa metal (ii) comprising a calcium compound, a magnesium compound, or admixture thereof.

8. The stabilized composition of matter as defined by claim 2, comprising from 0.005% to 1% by weight of the at least one organozinc derivative (i); from 0.005% to 5% by weight of at least one organic derivative of a Group IIa metal (ii); and 0.005% to 5% by weight of the at least one thiomalic acid diester (iii); all relative to the vinyl chloride based polymer.

9. The stabilized composition of matter as defined by claim 8, comprising from 0.01% to 0.6% by weight of the at least one organozinc derivative (i); from 0.02% to 1% by weight of the at least one organic derivative of a Group IIa metal (ii); and from 0.05% to 2% by weight of the at least one thiomalic acid diester (iii); all relative to the vinyl chloride based polymer.

10. The stabilized composition of matter as defined by claim 1, further comprising a polyol (iv) having a boiling point above 150° C.

11. The stabilized composition of matter as defined by claim 10, said polyol (iv) comprising sorbitol, mannitol or xylitol.

12. A composition of matter adapted for the stabilization of vinyl chloride based polymers, comprising from 5% to 40% by weight of at least one organozinc derivative (i); from 5% to 90% by weight of at least one organic derivative of a metal from Group IIa of the Periodic Table; and from 5% to 90% by weight of at least one thiomalic acid diester (iii).

13. The composition of matter as defined by claim 12, further comprising a polyol (iv) having a boiling point above 150° C.

14. A shaped article comprising the stabilized composition of matter as defined by claim 1.

* * * * *